(12) United States Patent
Klein et al.

(10) Patent No.: US 10,560,437 B2
(45) Date of Patent: *Feb. 11, 2020

(54) SECURITY IN MIXED NETWORKS

(71) Applicant: Avago Technologies General IP (Singapore) Pte. Ltd., Singapore (SG)

(72) Inventors: Philippe Klein, Jerusalem (IL); Avraham Kliger, Ramat Gan (IL); Yitshak Ohana, Givat Zeev (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,610

(22) Filed: Sep. 17, 2018

(65) Prior Publication Data

US 2019/0014091 A1 Jan. 10, 2019

Related U.S. Application Data

(63) Continuation of application No. 14/944,133, filed on Nov. 17, 2015, now Pat. No. 10,079,808.

(60) Provisional application No. 62/080,974, filed on Nov. 17, 2014, provisional application No. 62/092,787, filed on Dec. 16, 2014, provisional application No. 62/093,319, filed on Dec. 17, 2014.

(51) Int. Cl.
*H04L 29/06* (2006.01)
*H04L 9/08* (2006.01)
*H04L 9/32* (2006.01)
*H04L 9/14* (2006.01)

(52) U.S. Cl.
CPC ........ *H04L 63/0428* (2013.01); *H04L 9/0863* (2013.01); *H04L 9/14* (2013.01); *H04L 9/3226* (2013.01); *H04L 63/065* (2013.01)

(58) Field of Classification Search
None
See application file for complete search history.

(56) References Cited

U.S. PATENT DOCUMENTS

| 8,468,219 B2 | 6/2013 | Palm |
| 9,300,468 B2 | 3/2016 | Liu |
| 2011/0222549 A1 | 9/2011 | Connelly |

(Continued)

*Primary Examiner* — Kambiz Zand
*Assistant Examiner* — Arezoo Sherkat
(74) *Attorney, Agent, or Firm* — Morgan, Lewis & Bockius LLP

(57) ABSTRACT

A device may include a processor circuit configured to transmit, over a network medium, a request for transmission of a data communication to a first device of a network, and receive, over the network medium, a grant of the request. When the first device is associated with a first security profile, the processor circuit may be configured to encrypt the data communication based at least on a first password associated with the first security profile. When the first device is associated with a second security profile, the processor circuit may be configured to encrypt the data communication based at least on a second password associated with the second security profile. The second password may be associated with a higher password strength than the first password. The processor circuit may be configured to transmit, over the network medium, the encrypted data communication to the first device in response to the grant.

20 Claims, 5 Drawing Sheets

(56) References Cited

U.S. PATENT DOCUMENTS

| | | | |
|---|---|---|---|
| 2012/0239929 A1* | 9/2012 | Newman | H04L 63/06 713/168 |
| 2012/0272055 A1 | 10/2012 | Jung | |
| 2013/0046990 A1* | 2/2013 | Fahrny | H04L 63/08 713/176 |
| 2013/0155899 A1 | 6/2013 | Gallagher | |
| 2013/0246783 A1 | 9/2013 | Ho | |
| 2016/0050109 A1 | 3/2016 | Hebron | |
| 2016/0065582 A1* | 3/2016 | Hebron | H04L 12/2838 726/4 |
| 2016/0100310 A1 | 4/2016 | Lee | |
| 2016/0261572 A1* | 9/2016 | Liu | H04L 63/061 |
| 2017/0078283 A1 | 3/2017 | Unagami | |

* cited by examiner

SECURITY IN MIXED NETWORKS

CROSS-REFERENCE TO RELATED APPLICATIONS

The present application is a continuation of U.S. application Ser. No. 14/944,133, entitled "Security In Mixed Networks," filed Nov. 17, 2015, which claims the benefit of U.S. Provisional Patent Application Ser. No. 62/080,974, entitled "Security Mode Discrimination in Mixed Mode Networks," filed on Nov. 17, 2014; U.S. Provisional Patent Application Ser. No. 62/092,787, entitled "Network Security," filed on Dec. 16, 2014; and U.S. Provisional Patent Application Ser. No. 62/093,319, entitled "Network Security," filed on Dec. 17, 2014, which are hereby incorporated by reference in their entirety for all purposes.

TECHNICAL FIELD

The present description relates generally to security in communication networks, including security in mixed communication networks over a shared transmission medium.

BACKGROUND

Multiple different networks may share a common network infrastructure, such as a common transmission medium, in a given network environment. For example, a network environment in a dwelling unit may include multiple different networks that share one or more common network transmission media, such as one or more multimedia over coax alliance (MoCA) networks that share coaxial transmission media, one or more power-line networks that share a power-line transmission media, and the like. In the case of MoCA networks, MoCA networks utilize coaxial cables, such as television cables commonly installed in houses, to create data networks. Multiple-system operators (MSOs), which are operators of multiple cable or direct-broadcast satellite television systems, utilize MoCA devices for video distribution in the home.

Furthermore, if the dwelling unit is, for example, part of a multi-dwelling unit, the dwelling unit may share a coaxial backbone and/or a power-line backbone with other dwelling units in the multi-dwelling unit. In this instance, signals from networks of other dwelling units in the multi-dwelling unit may leak over the shared coaxial backbone and/or the shared power-line backbone into the network environment of the dwelling unit, and vice versa.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
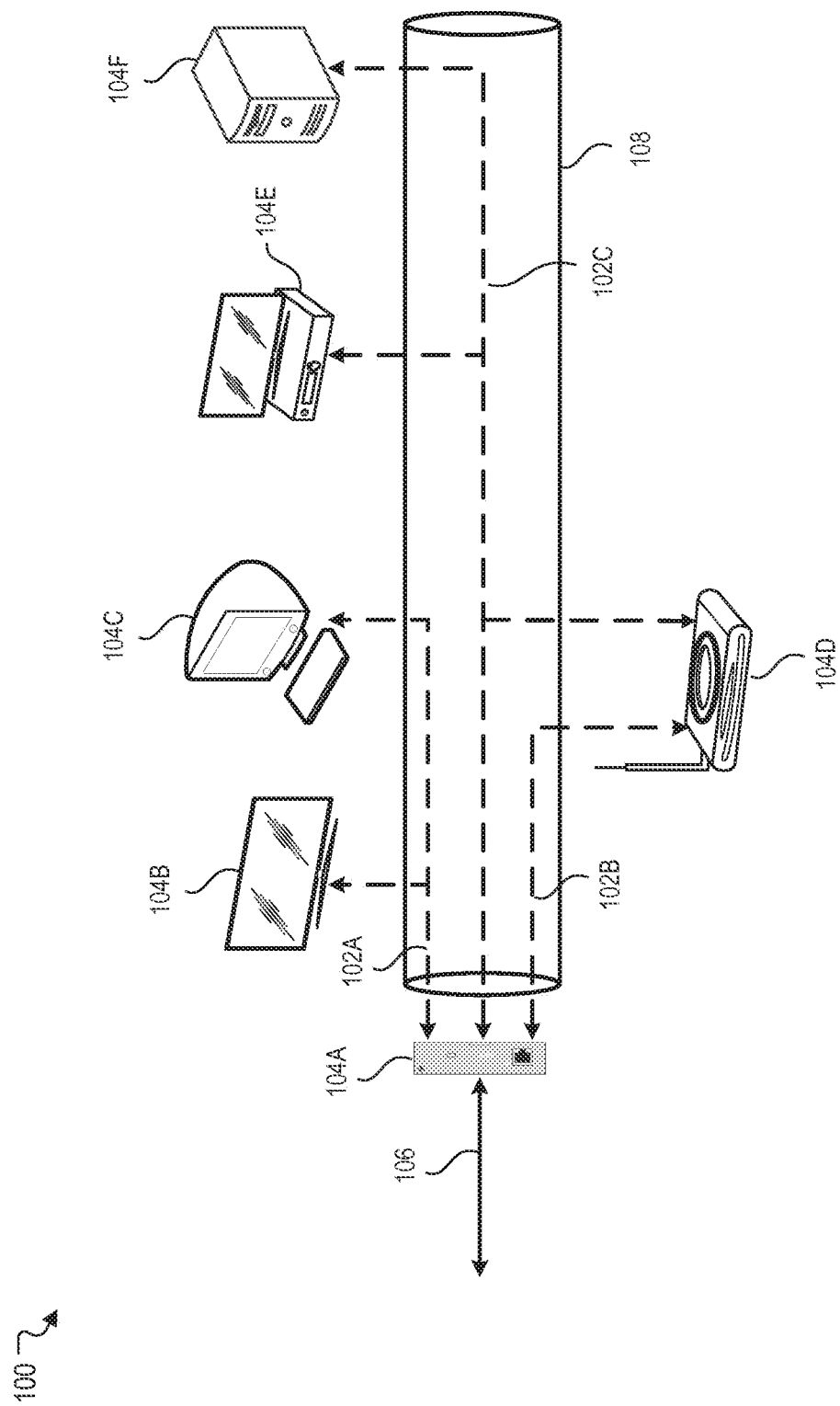
FIG. 1 illustrates an example of a network environment in which a system of security for mixed networks can be implemented in accordance with one or more implementations.

FIG. 1 illustrates an example of a network environment 100 in which a system of security for mixed networks can be implemented in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The network environment 100 includes transmission medium 108 over which multiple networks may co-exist, such as a network 102A having a first security profile, a network 102B having a second security profile, and/or a network 102C having a third security profile. The third security profile may be characterized as being more secure (e.g., having a higher security level) than the first security profile, and the second security profile may be characterized as being more secure than the third security profile. The transmission medium 108 may include one or more of a coaxial transmission medium, a powerline transmission medium, an Ethernet transmission medium, and/or one or more devices that facilitate communications over the transmission medium 108, such as splitters, diplexers, switches, etc.

The network environment 100 also includes devices 104A-F, each of which may implement one or more of the security profiles. One or more of the devices 104A-F is designated the network coordinator (NC). The NC may implement one or more of the security profiles, such as the second security profile. The NC may coordinate transmissions of the devices 104A-F over the networks 102A-C and may coordinate admission of new network devices into the network environment 100. The NC may also transmit discovery, beacon, and/or pilot signals such that the new network devices can discover the networks 102A-C and determine security capabilities associated with the networks 102A-C.

For explanatory purposes, the network environment 100 includes multiple networks 102A-C in each of which the device 104A is designated as the NC. The device 104A may be, may include, or may be a part of a home gateway device. In one or more implementations, the network environment 100 may include a single network, such as a single MoCA network, for which the device 104A is designated as the NC.

In this instance, the networks 102A-C may each be considered as separate sub-networks, or segregated data traffic, of the single network for which the device 104A is the NC. The networks 102A-C may physically utilize the same transmission medium 108, but the networks 102A-C may be logically separated, e.g. through the use of the different security profiles. For example, devices of the networks 102A,C may be unable to decrypt data traffic associated with the network 102B.

The network 102A may be, may include, or may be a part of, a MoCA network for facilitating communication between legacy MoCA devices, such as the devices 104B-C; the network 102B may be, may include, or may be a part of, a MoCA network for facilitating communication between non-legacy MoCA devices, such as the device 104D; and the network 102C may be, may include, or may be a part of, a MoCA network for facilitating communication between authorized legacy MoCA devices, such as the devices 104E-F, and non-legacy MoCA devices, such as the device 104D. As used herein, legacy MoCA may refer to, for example, MoCA 1.0, MoCA 1.1, and/or MoCA 2.0. As used herein, non-legacy MoCA may refer to, for example, any version of MoCA that has not been designated as legacy, such as MoCA 2.1, MoCA 2.5, MoCA 3.0, and any other non-legacy MoCA versions. The NC may coordinate admission of new network devices, including new legacy MoCA devices and new non-legacy MoCA devices.

The network 102A is coordinated by the device 104A, e.g. the NC, and is used for communications between legacy MoCA devices that implement the first security profile, such as the devices 104B-C. For example, the device 104B may be a display device that is running a stream client application, and the device 104C may be a computing device that is running a web browser application. The network 102B is coordinated by the device 104A, e.g. the NC, and is used for communications between non-legacy MoCA devices that implement the second security profile, such as the device 104D. The network 102C is coordinated by the device 104A, e.g. the NC, and is used for communication between legacy MoCA devices that implement the third security profile, such as authorized legacy MoCA devices, including the devices 104E-F, and non-legacy MoCA devices, such as the device 104D. For example, the device 104E may be a video server device, and the device 104F may be a set-top box (STB) device. A wide area network (WAN) connection 106 connects the device 104A to a WAN, such as a network operated by an MSO.

The legacy MoCA devices 104E-F associated with the network 102C are authorized and/or authenticated by a network management device such that they are allowed by network management device to communicate with the non-legacy device 104D. Thus, the network 102C may be referred to as a mixed network because the network 102C includes both authorized legacy MoCA devices, e.g. the devices 104E-F, and non-legacy MoCA devices, e.g. the device 104D. The legacy MoCA devices 104E-F may be referred to as authorized and/or authenticated legacy MoCA devices 104E-F. In other cases, the legacy MoCA devices 104E-F may be dynamically authorized based on the legacy MoCA devices 104E-F successfully completing an authentication procedure. The legacy MoCA devices 104B-C associated with the network 102A have not been authorized and/or authenticated and/or failed the authorization and/or authentication. The legacy MoCA devices 104B-C associated with the network 102A may be referred to as unauthorized MoCA legacy devices 104B-C, and/or MoCA legacy devices 104B-C. In some cases, legacy MoCA devices may be authorized based on a static configuration (e.g., by an MSO) rather than, and/or in addition to, dynamically by successfully completing an authentication procedure.

The network management device may be one or more of the NC or an authentication server. The network management device may be separated from the NC and/or the authentication server and/or may be one of the non-legacy MoCA devices. The authentication of the legacy MoCA devices 104E-F may be performed by the network management device, the NC, and/or the authentication server. In some cases, the authentication server is the NC (e.g., the device 104A). In some cases, the authentication server is the network management device. In some cases, the authentication server is separated from the NC and/or may be one of the non-legacy MoCA devices. In some cases, the network management device is the NC.

The first security profile, associated with the network 102A, and/or the third security profile, associated with the network 102C, may be associated with lower security encryption scheme (or no encryption) and/or a lower password strength (e.g., lower entropy) than the second security profile. The networks 102A,C may be secured using a legacy MoCA password, which may be a 17 decimal digit password. Some devices associated with the networks 102A,C, such as MoCA 1.0 and 1.1 devices, may utilize the Data Encryption Standard (DES) to encrypt data traffic, while other devices associated with the networks 102A,C, such as MoCA 2.0 devices, may utilize Advanced Encryption Standard (AES) to encrypt data traffic. Thus, the devices that utilize AES encryption may be referred to as AES-enabled devices, while the devices that do not utilize AES encryption are not AES-enabled. In some cases, the legacy MoCA devices may be deployed without privacy, in which case the data traffic is transmitted in the clear (e.g., not encrypted).

The encryption keys utilized for DES may have a key length of, for example, 56-bits. The encryption keys utilized for AES may have a key length that is longer than the key length for the encryption keys utilized for DES. The key length associated with AES may be, by way of non-limiting example, 128-bit, 192-bit, or 256-bit. In some cases, MoCA 2.x devices exclusively use a key length of 128-bit. The encryption keys utilized for both AES and DES may be derived from the same legacy password that is shared by the networks 102A,C. In this regard, the lesser secured DES encryption keys may demote the security of the AES encryption key. For instance, cracking of the password may provide both DES and AES encryption keys.

In some cases, the third security profile is the same as the first security profile with regard to the encryption scheme and/or password strength. For example, devices that implement the third security profile may share the same legacy password as devices that implement the first security profile. The third security profile may be attributed to those devices that have been authorized and/or authenticated by the NC to communicate with devices that implement the second security profile.

The second security profile, associated with the network 102B, may be associated with higher security encryption and/or higher password strength (e.g., better entropy) than the first and third security profiles. The password shared by devices of the network 102B may be longer than the legacy password. For example, the password shared by devices of the network 102B may be a 64 byte passphrase. The password shared by devices of the network 102B may be referred to as a non-legacy password. The higher security encryption and/or higher password strength associated with the second security profile may allow the network 102B to be less prone to security attacks than the networks 102A,C. Non-legacy devices (e.g., the devices 104A,D) associated with the network 102B may utilize the AES encryption scheme to encrypt their data traffic. The AES encryption keys may be derived from the non-legacy password, to avoid exposure to the lower password strength of the legacy password and/or weaker DES encryption scheme that may be associated with the first and third security profiles.

In one or more implementations, the subject technology facilitates implementation and coexistence of different security profiles and security levels in a network, in which devices of the mixed network 102C share transmission media, such as coax transmission media. Although the networks 102A-C have different security profiles, one or more of the devices associated with the networks 102A-C may be interoperable and may communicate with one another over the mixed network 102C via the shared transmission media. In implementations of the subject technology, devices (e.g., the device 104D) of the network environment 100 that are associated with higher security are not compromised by devices of the network environment 100 that are associated with lower security on the mixed network 102C.

To facilitate implementation and coexistence of the various security profiles present in the network environment 100, data traffic differentiation may be deployed in the network environment 100. For example, the data traffic differentiation may be deployed to differentiate data traffic between each of the networks 102A-C. The networks 102A-C may operate in unicast or multicast mode. The differentiation may be based on the different passwords and/or encryption scheme associated with the various security profiles.

In some cases, data traffic differentiation is deployed for the unicast mode. In the unicast mode, transmissions (e.g., unicast datagram transmissions) between any two AES-enabled MoCA devices, such as between the device 104A and the device 104D, may be sent in a MoCA 2.0 physical layer (PHY) profile. The AES-enabled MoCA devices may include MoCA 2.x devices, such as legacy MoCA 2.0 devices and non-legacy MoCA devices (e.g., MoCA 2.1, MoCA 2.5, etc.). These transmissions between two AES-enabled MoCA devices may be AES encrypted. In the case that the two AES-enabled MoCA devices are non-legacy MoCA devices, encryption keys may be derived from a non-legacy password shared by the non-legacy MoCA devices. The encryption keys utilized for AES may have a key length of, for example, 128-bit, 192-bit, or 256-bit. In some cases, the encryption keys may be encryption keys derived based on an enhanced pre-shared key (EPSK) protocol, which will be described later.

Transmissions between a non-legacy MoCA device and an authorized legacy MoCA device may be AES encrypted when the authorized legacy MoCA device is AES-enabled (e.g., MoCA 2.0 device) or may be DES encrypted when the authorized legacy MoCA device is not AES-enabled (e.g., MoCA 1.1 device). Encryption keys may be based on a legacy password shared by the legacy devices of the networks 102A,C and known to the non-legacy devices of the network 102B. The legacy password shared by the legacy MoCA devices may be known to the non-legacy MoCA devices to facilitate communication between non-legacy MoCA devices and authorized legacy MoCA devices. Transmissions between two legacy MoCA devices, whether authorized or unauthorized, to communicate with non-legacy MoCA devices, may be AES encrypted when both legacy MoCA devices are AES-enabled, and may be DES encrypted when at least one of the legacy MoCA devices associated with the transmissions is not AES-enabled. Thus, the authorized legacy MoCA devices may communicate with non-legacy MoCA devices as well as legacy MoCA devices, whether the legacy MoCA devices are authorized or unauthorized. In some cases, the authorized legacy MoCA devices may be utilized to relay information between unauthorized legacy MoCA devices and non-legacy MoCA devices, since the unauthorized legacy MoCA devices may not be allowed to communicate directly with the non-legacy MoCA devices, and vice versa. Such relaying may be performed at layers above the MoCA PHY and MAC layers.

To allow communication between devices (e.g., the devices 104A,D) associated with the network 102B with devices (e.g., the devices 104B-C, E-F) associated with the networks 102A,C, devices of the network 102B may have knowledge of the password shared by devices of the networks 102A,C. The legacy password and the non-legacy password may be unique and independent of one another. For example, the legacy password for the networks 102A,C may be independent of the non-legacy password for the network 102B. In other cases, the legacy password for the networks 102A,C may be derived from the non-legacy password for the network 102B. For example, the legacy password for the networks 102A,C may be derived (e.g., irreversibly derived) through a hash function from the non-legacy password for the network 102B.

In the multicast mode, the current MoCA specification has a provision to broadcast media access control (MAC) multicast data frames in a most common PHY profile (e.g., MoCA 1.x or MoCA 2.0 PHY profile) of the MoCA version of all egress devices registered to the given MAC group address. In some cases, when all the devices of the group address are AES-enabled (e.g., MoCA 2.x devices), the multicast data frames may be sent in the MoCA 2.0 PHY profile (e.g., AES encrypted).

In one or more implementations, to facilitate implementation and coexistence of the various security profiles present in the network environment 100, the privacy modes (or no-privacy mode) associated with the networks 102A,C may be run independent of the privacy mode associated with network 102B. Thus, currently deployed legacy devices (e.g., the devices 104B-C,E-F) need not be reconfigured to remain deployed in the network environment 100 in the presence of non-legacy devices. In some cases, MoCA 2.x devices (e.g., legacy MoCA 2.0 devices and non-legacy MoCA devices) may provide a user friendly Push Button method for running the MoCA 2.x device in privacy mode. In one or more aspects, privacy may refer to protection, protected, concealment, concealed, security, secure, encryption, encrypted, private, reserved, exclusive, secrecy, secret, stealth, closed (not open), or the like.

For example, in the current MoCA specification, the privacy is provided as a per network global option. In order to enable privacy mode in a mixed network under the current specification, the user would have to manually configure a password to all the deployed legacy MoCA devices of the mixed network. MSOs may prefer that users do not reconfigure previously deployed legacy MoCA devices. For instance, deployment of non-legacy MoCA devices may be facilitated if users do not need to reconfigure legacy MoCA devices.

Data traffic associated with the network 102B may be deployed with privacy (e.g., in privacy mode) while data traffic associated with the networks 102A,C may be deployed without privacy (e.g., in no-privacy mode) or with privacy (e.g., in privacy mode). The privacy mode of the networks 102A,C may be associated with lower security than the privacy mode of the network 102B. The higher security level of the privacy mode of the network 102B may be utilized to facilitate data distribution, unprotected video content, and/or other services that may require stronger protection. In some cases, the data traffic associated with the network 102B is exclusively deployed with privacy. In these cases, the network 102B does not allow any of its data traffic to be deployed without privacy. When the networks 102A-C are deployed with privacy, the admission protocol may include a security mechanism, such as a key exchange between the devices 104A-F of the networks 102A-C.

To facilitate deployment of the privacy mode for the data traffic associated with the network 102B and the privacy mode or no-privacy mode allowed by the networks 102A,C, devices associated with the network 102B may utilize one shared password (e.g., a non-legacy password) and devices associated with the networks 102A,C may utilize another shared password (e.g., a legacy password). The passwords may be utilized as seed passwords to generate encryption keys. The privacy mode of the networks 102A,C may utilize an encryption scheme (e.g., DES) associated with a lower security level than an encryption scheme (e.g., AES) associated with the network 102B and/or may utilize a seed password (e.g., the 17 decimal digit password) associated with lower entropy than the seed password associated with the network 102B. For example, the privacy mode of the networks 102A,C may be generally used for differentiating between neighboring networks.

In some cases, the non-legacy password for the network 102B is not exposed to DES encryption, which may compromise the AES encryption. The higher password strength and/or the higher security encryption scheme associated with the network 102B may allow for better protection of transmissions between the non-legacy devices. In some aspects, data traffic between non-legacy MoCA devices are exclusively AES encrypted with an encryption key derived from the non-legacy passphrase or password different from the legacy password.

In some aspects, the network environment 100 may facilitate transmission of video content. Because video services may be protected in higher layers by their own protocol, such as digital rights management (DRM) protection, MoCA security (e.g., MoCA encryption) may be redundant. In such cases, the networks 102A,C may be deployed in a no-privacy mode by the MSO in order to allow plug and play installation without compromising the security of the video services. The plug and play installation may not require a user to manually configure a network password for the networks 102A,C. In other cases, the networks 102A,C may be deployed in a privacy mode, such as to provide MoCA encryption to video content.

In FIG. 1, the network 102B may be utilized as a MoCA backbone to bridge with a Wi-Fi network, through access points (APs) such as the device 104D. In some cases, a bridge, such as a non-legacy MoCA-to-WiFi bridge, may be configured with a strong privacy mode in order to avoid exposing the wireless traffic in the clear (e.g., non-encrypted) on the MoCA backbone that bridges the Wi-Fi APs. In one or more implementations, the security level associated with the MoCA backbone does not demote the level of security of services the MoCA backbone bridges (e.g., Wi-Fi).

In one or more implementations, the various security profiles may be maintained independent of one another. In some cases, the second security profile may be implemented with an EPSK protocol. The enhancement may be dependent on application in which devices and networks associated with or otherwise implementing the second security profile are deployed. The enhancement of the second security profile may be independent of (e.g., not affect) the first and third security profiles. The utilization of the EPSK protocol for the second security profile may be facilitated by data traffic differentiation between the network 102B, which has the second security profile, and the networks 102A,C, which has the first and third security profiles.

For example, in some cases, the device 104D may be, may include, or may be a part of, a Wi-Fi extender that may be utilized to serve as a MoCA-to-WiFi bridge, with the network 102B being utilized as a MoCA backbone for the wireless links. The EPSK utilized by the device 104D may be designed to be on par with a strongest deployed Wi-Fi PSK security level associated with the wireless links bridged by the network 102B. Utilization of an EPSK that is on par with the strongest deployed Wi-Fi PSK security level may help prevent the network 102B that bridges the wireless links from compromising the security level of the wireless links (e.g., the services bridged by the MoCA backbone).

In some cases, password entropy associated with the MoCA PSK may be increased. A standard key derivation protocol may be utilized. For example, an AES key derivation protocol may be utilized for the MoCA PSK based on Wi-Fi's WPA2-PSK protocol. The AES key derivation protocol may utilize a 63-character maximum passphrase and/or a Password-Based Key Derivation Function 2 (PBKDF2). The number of iterations may be increased above that of the WPA2-PSK to further slow down attacks (e.g., dictionary attacks).

In one or more implementations, a pre-admission security capability advertisement between a new network device and the NC may be added to enhance security of the networks 102A-C of the network environment 100. In some cases, the new network device may decide not to join a MoCA network and/or the NC may reject an admission request from the new network device if authentication methods are not supported by the new network device. Admission rules may be left for management policy. For example, admission rules may be based on network admission rules set by the Management Entity policy. Provisions may allow for expandability to other authentication methods as new security issues are discovered.

In some cases, a privacy capability setting may be utilized to allow a new network device to know which security (e.g., privacy) modes are supported by the network environment 100. For example, the privacy capability setting may indicate that the network environment 100 supports one or more of the first security profile, the second security profile, and the third security profile. The privacy capability setting may be set by a password provider, which may provide the legacy and/or non-legacy passwords associated with the network environment 100. In some cases, the privacy capability setting is understood by non-legacy MoCA devices but not legacy MoCA devices.

The new network device may determine whether to join the network environment 100 based on the security modes supported by the network environment 100. For example, the new network device may be a non-legacy MoCA device that may adapt its settings to allow interoperability with legacy MoCA devices based on the privacy capability setting. In other cases, the new network device may decide not to join the network environment 100 to avoid exposing itself to, for example, the legacy MoCA devices, which are associated with lower security than non-legacy devices. For example, the privacy capability setting may provide information indicative of a lowest MoCA version number among all MoCA devices in the network environment 100.

In one or more implementations, to facilitate coexistence and allow interoperability of non-legacy MoCA devices and legacy MoCA devices in the network environment 100, the non-legacy MoCA devices are allowed to exchange control traffic datagrams with the legacy MoCA devices, and vice versa. For example, the non-legacy MoCA devices may exchange AES control traffic datagrams with AES-enabled legacy MoCA devices, where the AES encryption is based on the legacy password. The non-legacy MoCA devices may exchange DES control traffic datagrams with legacy MoCA devices that are not AES-enabled (e.g., MoCA 1.1 devices), where the DES encryption is based on the legacy password.

In one or more implementations, non-legacy MoCA devices (e.g., the devices 104A,D) may send reservation requests to the NC for transmission opportunities to other non-legacy devices (e.g., using AES encrypted datagram) and authorized legacy MoCA devices. For transmissions associated with a non-legacy MoCA device, AES or DES encrypted datagrams may be utilized. For example, if the transmission is from the non-legacy device to a MoCA 1.1 device, DES may be utilized. If the transmission is from the non-legacy device to a MoCA 2.0 device, AES may be utilized. In one or more implementations, non-legacy MoCA devices do not request transmission opportunities otherwise.

In one or more implementations, although the exchange of control traffic datagrams is allowed between non-legacy MoCA devices and legacy MoCA devices, whether authorized or unauthorized, exchange of data traffic datagrams between non-legacy MoCA devices and legacy MoCA devices may not be allowed. For instance, preventing transmissions between non-legacy MoCA devices and unauthorized legacy MoCA devices may help prevent man-in-the-middle (MiM) attacks, in which unauthorized legacy MoCA devices may be utilized to compromise the security associated with non-legacy MoCA devices. However, in some cases, completely preventing transmissions from non-legacy MoCA devices to unauthorized legacy MoCA devices might not be applicable in already deployed networks, such as those that provide MSO video services.

In one or more implementations, non-legacy MoCA devices may be set to allow all data traffic datagram transmissions, no data traffic datagram transmissions, or some data traffic datagram transmissions with legacy MoCA devices. The setting may be set for the non-legacy MoCA devices, such as by an MSO, based on application. Implementing and enforcing the setting of the non-legacy MoCA devices may be performed by the non-legacy MoCA device.

In some cases, a non-legacy MoCA device may allow exchange of data traffic datagrams (e.g., multicast data traffic datagrams, unicast data traffic datagrams) with legacy MoCA devices, including authorized legacy MoCA devices and unauthorized legacy MoCA devices. In such cases, the non-legacy MoCA device may send reservation requests to the NC for transmission opportunities to legacy MoCA devices, whether authorized or unauthorized. For example, non-legacy MoCA devices that are gateway devices may be set to allow communication with authorized legacy MoCA devices as well as unauthorized legacy MoCA devices. These non-legacy MoCA devices may be allowed to exchange AES data traffic datagrams with AES-enabled legacy MoCA devices and DES data traffic datagrams with legacy MoCA devices that are not AES-enabled, where the AES and DES encryption is based on the legacy password.

In some cases, a non-legacy MoCA device is set to prevent exchange of data traffic datagrams with legacy MoCA devices, whether they are authorized or unauthorized. In such cases, the non-legacy MoCA device is not allowed (e.g., not authorized) to send reservation requests to the NC for transmission opportunities to any legacy MoCA device. The non-legacy MoCA device may ignore and/or drop data traffic datagrams that it may receive from any legacy MoCA device. In such cases, the non-legacy MoCA device may not decrypt and/or consume the data traffic datagrams received from legacy MoCA devices.

In some cases, a non-legacy MoCA device may allow exchange of data traffic datagrams (e.g., unicast data traffic datagrams) with authorized legacy MoCA devices and not allow exchange of data traffic datagrams with unauthorized legacy MoCA devices. In such cases, the non-legacy MoCA device is authorized to send reservation requests to the NC for transmission opportunities to authorized legacy MoCA devices, but the non-legacy MoCA device is not authorized to send reservation requests to the NC for transmission opportunities to unauthorized legacy MoCA devices. These non-legacy MoCA devices may be allowed to exchange AES data traffic datagrams with authorized AES-enabled legacy MoCA devices and DES data traffic datagrams with authorized legacy MoCA devices that are not AES-enabled, where the AES and DES encryption is based on the legacy password. The non-legacy MoCA device may ignore and/or drop data traffic datagrams that it may receive from unauthorized legacy MoCA devices. In such cases, the non-legacy MoCA device may not decrypt and/or consume the data traffic datagrams received from unauthorized legacy MoCA devices. The non-legacy MoCA device may be utilized to relay information between unauthorized legacy MoCA devices and non-legacy MoCA devices, e.g. non-legacy MoCA devices that are not allowed to transmit data traffic datagrams to unauthorized legacy MoCA devices.

By way of non-limiting example, transmission may be facilitated for: AES encrypted transmissions between non-legacy devices; AES encrypted transmissions between non-legacy devices and authorized AES-enabled legacy devices (e.g., authorized MoCA 2.0 devices); DES encrypted transmissions between non-legacy devices and authorized legacy devices that are not AES-enabled (e.g., authorized MoCA 1.0 or 1.1 devices); AES encrypted transmissions between a non-legacy gateway MoCA device and any AES-enabled legacy devices; DES encrypted transmissions between a non-legacy gateway MoCA device and any legacy MoCA devices that are not AES-enabled; and DES encrypted transmissions between legacy MoCA devices that are not AES-enabled. Such transmissions may be facilitated while preventing MiM attacks, as unicast datagrams are not exchanged between non-legacy MoCA devices and unauthorized legacy MoCA devices, unless the non-legacy MoCA devices are gateway devices.

In one or more implementations, authentication protocol messages are sent to any MoCA device in the network environment 100. The authentication protocol messages may utilize a predetermined Ethertype, such as an Extensible Authentication Protocol over LAN (EAPoL) Ethertype. For example, the authentication protocol messages may utilize EAPoL containers, in accordance with the Institute of Electrical and Electronics Engineers (IEEE) 802.1X standard. The authentication protocol messages may be transmitted in the clear (e.g., without encryption) as the authentication protocols themselves may be inherently secure.

The protocol handshake may involve a new legacy MoCA device (e.g., the device 104E). The new legacy MoCA device may trigger a network management device for authentication. The new legacy MoCA device that can successfully respond to a challenge may be authenticated and identified as an authorized legacy device. For example, the new legacy MoCA device may provide a response to the NC for a challenge received from the NC. The authentication of the new legacy MoCA device may be by the NC and/or by an authentication server separated from the NC. In some cases, the authentication server is the NC (e.g., the device 104A). In other cases, the authentication server is separated from the NC and/or may be one of the non-legacy MoCA devices. The network management device may be separated from the NC and/or the authentication server and/or may be one of the non-legacy MoCA devices.

The authentication server may transmit an indication to the NC to inform the NC that the new legacy MoCA device has been successfully authenticated. In some cases, the NC may receive the indication from the network management device, where the network management device may be the authentication server or the network management device may receive the indication from the authentication server. The NC may acknowledge the response of the new legacy MoCA device. The NC may notify the non-legacy MoCA devices of the additional authorized legacy MoCA device. For example, the NC may transmit a notification to the non-legacy MoCA devices, where the notification comprises an indication that the new legacy MoCA device has been authorized. Subsequent to authorization, the non-legacy MoCA device may be allowed (e.g., authorized) to send reservation requests to the NC for transmission opportunities to authorized legacy MoCA devices. In some implementations, subsequent to authorization, the NC may grant transmission opportunities to requests from an authorized legacy MoCA device to transmit to the non-legacy MoCA device.

In one or more implementations, the new legacy MoCA device may trigger the network management device for authentication through a software program (e.g., daemon software program) running on the new legacy MoCA device. In some cases, the network management device is the NC. The software program may run on a layer different from the legacy MoCA device, and may allow the legacy MoCA device to become an authorized legacy MoCA device. For example, the software program may be run on a layer different from the PHY layer and the MAC layer. In some cases, the software program may facilitate the elevation of legacy MoCA devices to authorized legacy MoCA devices without reconfiguring the PHY layer and/or the MAC layer of the legacy MoCA devices. In some cases, the legacy MoCA devices that request the authentication and authorization may be those legacy MoCA devices currently deployed by the MSO that the MSO wants to allow to communicate with the non-legacy MoCA devices. For example, the MSO may allow or may cause the software program to be run on certain legacy MoCA devices.

In one or more implementations, the subject technology facilitates implementation and coexistence of different security profiles and security levels in a mixed network, in which devices of the mixed network share transmission media, such as a coax transmission media. Security of the devices (e.g., the device 104D) of the mixed network that are associated with higher security is not demoted due to presence of devices in the mixed network that are associated with lower security. Thus, the devices associated with the higher security may have reduced security risks, such as those that may arise from a leakage of signals to and/or from a neighboring network, an existing coaxial topology that makes a splitter accessible to an intrusive hacker, lower security devices in the mixed network (e.g., lower password strength, weaker encryption scheme), MiM attacks, among others.

Figure 2:
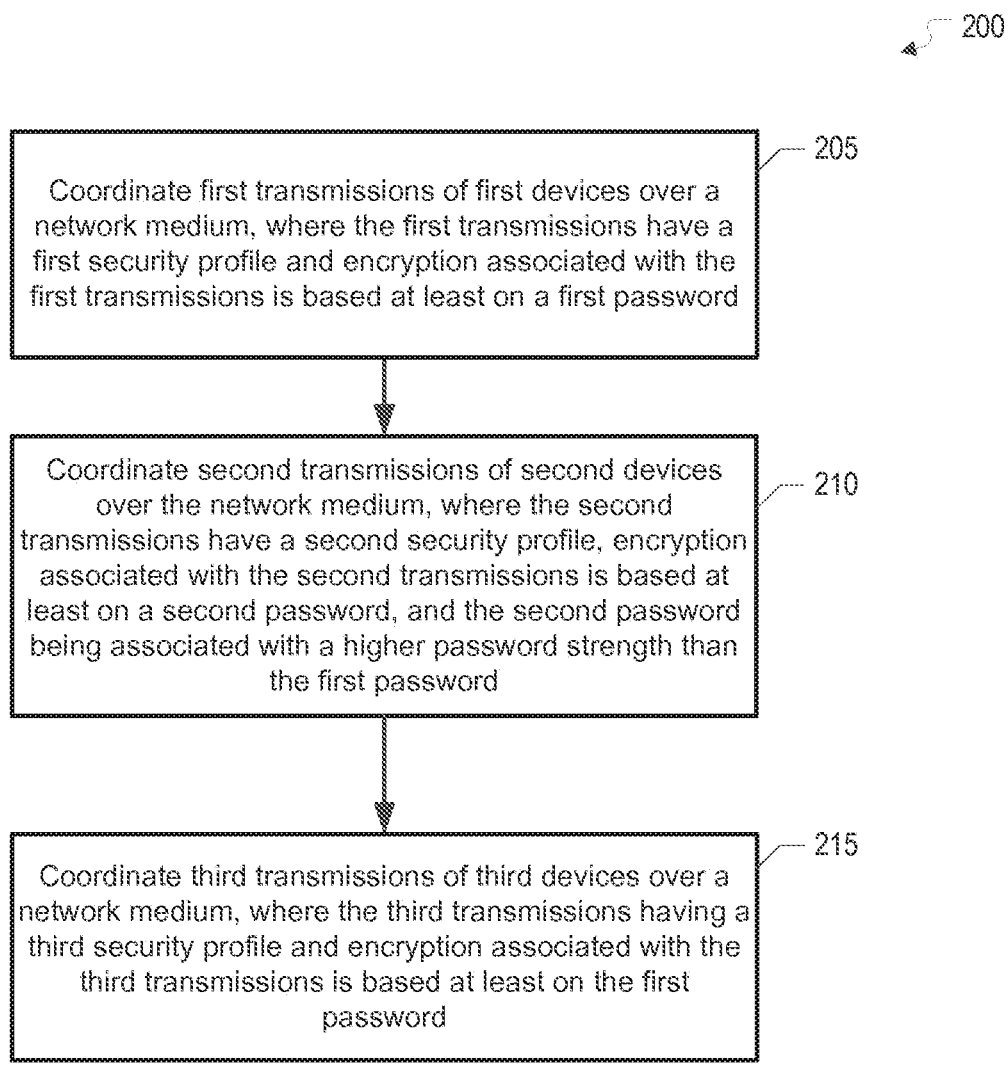
FIG. 2 illustrates a flow diagram of an example process in a system of security for mixed networks in accordance with one or more implementations.

FIG. 2 illustrates a flow diagram of an example process 200 in a system of security for mixed networks in accordance with one or more implementations. For explanatory purposes, the device 104A is designated as an NC of the example network environment 100 of FIG. 1. The example process 200 is described herein with reference to the NC of the example network environment 100 of FIG. 1; however, the example process 200 is not limited to the NC of the example network environment 100 of FIG. 1. The blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

The device 104A may coordinate first transmissions of first devices (e.g., legacy devices) over a network medium (205), where the transmissions have a first security profile. The network medium may be a coaxial medium. The first security level is associated with transmissions between devices that implement the first security profile. The first devices may include the devices 104B-C that implement the first security profile. The first devices may share a legacy password (e.g., 17 decimal digit password). Between the first devices, transmissions between a MoCA 1.0 or 1.1 device and a MoCA 1.0, 1.1, or 2.0 device may be DES encrypted. Transmissions between MoCA 2.0 devices may be AES encrypted. For DES and AES encryption, the encryption keys are derived from the shared legacy password of the first devices.

The coordination of the first transmissions may include receiving and granting reservation requests from the device 104B (e.g., or any other of the first devices) to allow transmissions over the network medium between the device 104B and one or more other devices of the network environment 100. The other device(s) may be another of the first devices (e.g., the device 104C) and/or a device (e.g., an authorized legacy device such as the device 104E) that implements the third security profile.

In some cases, the device 104A may receive reservation requests to allow transmissions between the device 104B and a device (e.g., the device 104D) that implements the second security profile. The device 104A may grant these reservation requests. For example, the device 104A may receive and grant a reservation request from the device 104B (e.g., an unauthorized legacy MoCA device) for transmission to the device 104D (e.g., a non-legacy MoCA device). The device 104B may transmit a data traffic datagram to the device 104D. However, the device 104D may ignore and/or drop the data traffic datagram. Thus, the device 104D may facilitate prevention of the lower security level associated with the first security profile of the device 104B from compromising the security level of the devices associated with the second security profile, including the device 104D. In some cases, the device 104D is not allowed (e.g., not authorized) to send reservation requests to the device 104A for transmission opportunities to the device 104B. In other cases, the device 104D may be set to allow sending of reservation requests to the device 104A for transmission opportunities to the device 104B and transmit a data traffic datagram to the device 104B. For example, the device 104D may be a gateway device in the network environment 100.

The device 104A may coordinate second transmissions of second devices (e.g., the non-legacy device 104D) over the network medium (210), where the transmissions have a second security profile. The second security level is associated with transmissions between devices that implement the second security profile. The second devices may include the devices 104A,D that implement the second security profile. The second devices may share a non-legacy password (e.g., 64 byte passphrase) associated with higher password strength than the legacy password shared by the first devices.

Transmissions between a non-legacy device (e.g., of the second devices) and an authorized MoCA 1.0 or 1.1 device may be DES encrypted, with encryption keys being derived from the shared legacy password of the first devices. Transmissions between a non-legacy device and an authorized MoCA 2.0 device may be AES encrypted, with encryption keys being derived from the shared legacy password of the first devices (e.g., the third devices share the same legacy password as the first devices). Transmissions between two non-legacy devices may be AES encrypted, with encryption keys being derived from the shared non-legacy password of the second devices. In order to facilitate communication between the second devices and authorized MoCA devices, the second devices have knowledge of the shared legacy password of the first devices.

The coordination of the second transmissions may include receiving and granting reservation requests from the device 104D (e.g., or any other of the second devices) to allow transmissions over the network medium between the device 104D and one or more other devices of the network environment 100. The other device(s) may be another of the second devices and/or a device (e.g., an authorized legacy device such as the device 104E) that implements the third security profile.

In some cases, the device 104A may receive reservation requests to allow transmissions between the device 104D and a device (e.g., the device 104C) that implements the first security profile. The device 104A may grant these reservation requests.

The device 104A may coordinate third transmissions of third devices (e.g., authorized legacy devices 104E-F and non-legacy device 104D) over the network medium (215), where the transmissions have the third security profile. The third security level is associated with transmissions between devices that implement the third security profile. The third devices may include the authorized legacy devices 104E-F and the non-legacy device 104D that implement the third security profile. In some cases, the third devices may share the same legacy password as the password shared by the first devices.

Transmissions between an authorized legacy device (e.g., of the third devices) and a MoCA 1.0 or 1.1 device, whether authorized (e.g., implements third security profile) or not authorized (e.g., implements first security profile), may be DES encrypted, with encryption keys being derived from the shared legacy password. Transmissions between an authorized legacy device and an authorized MoCA 2.0 device, whether authorized or not authorized, may be AES encrypted, with encryption keys being derived from the shared legacy password. Transmissions between an authorized legacy device and a non-legacy device may be AES encrypted, with encryption keys being derived from the shared legacy password.

The coordination of the third transmissions may include receiving and granting reservation requests from the device 104E (e.g., or any other of the third devices) to allow transmissions over the network medium between the device 104E and one or more other devices of the network environment 100. The other device(s) may be one of the first devices, one of the second devices, and/or another of the third devices.

In one or more implementations, the first security profile is maintained independently of the second security profile. For example, the devices 104B-C may be run in privacy mode or in no-privacy mode, whereas the devices 104A,D are run in privacy mode. Furthermore, the devices 104B-C encrypt data traffic using encryption keys derived from a password shared by at least the devices 104B-C whereas the devices 104A,C encrypt data traffic using encryption keys derived from a different password shared by at least the devices 104A,C.

In one or more implementations, the device 104A may utilize protocol handshakes with legacy devices (e.g., the first devices) to allow the legacy devices to become authorized to communicate with the second devices. The device 104A may notify the second devices when an additional legacy device becomes authorized (e.g., the additional legacy device is elevated to the third security profile).

Figure 3:
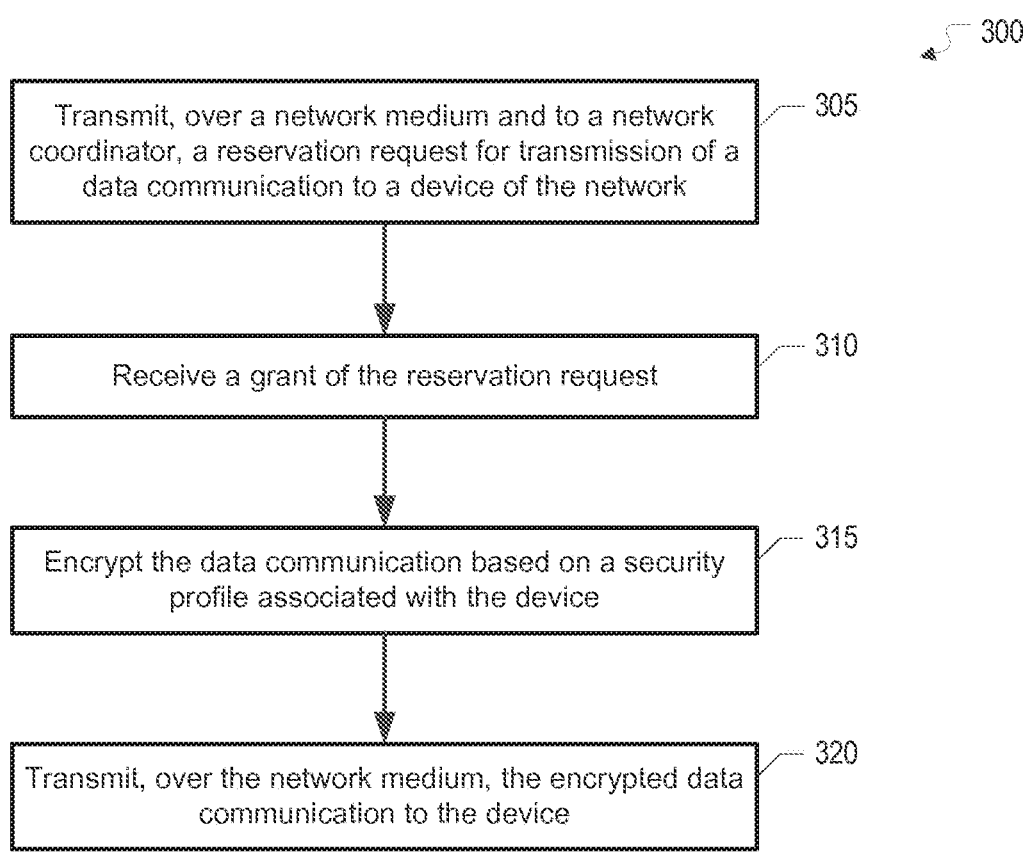
FIG. 3 illustrates a flow diagram of an example process in a system of security for mixed networks in accordance with one or more implementations.

FIG. 3 illustrates a flow diagram of an example process 300 in a system of security for mixed networks in accordance with one or more implementations. For explanatory purposes, the device 104D is a non-legacy MoCA device of the example network environment 100 of FIG. 1. The example process 300 is described herein with reference to the device 104D of the example network environment 100 of FIG. 1; however, the example process 300 is not limited to the device 104D of the example network environment 100 of FIG. 1. The blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The device 104D may transmit, over a network medium (e.g., coaxial medium), a reservation request to an NC for transmission of data traffic to another device of a network (305). The reservation request may be a request for transmission of data traffic over the network medium to a device that implements the first security profile, e.g. an unauthorized legacy MoCA device such as the device 104B. The reservation request may be a request for transmission of data traffic over the network medium to a device that implements the second security profile, e.g. a non-legacy MoCA device such as the device 104A. The reservation request may be a request for transmission of data traffic over the network medium to a device that implements the third security profile, e.g. an authorized legacy MoCA device such as the device 104E. In some cases, the device 104D is not allowed (e.g., by network policy) to transmit reservation requests to the NC for transmission of data traffic to devices associated with the first security profile (e.g., unauthorized legacy devices).

The reservation request may be based on the security profile associated with the other device. In some cases, the device 104D is not allowed (e.g., not authorized) to send reservation requests for transmission opportunities to the other device when the other device implements the first security profile (e.g., unauthorized legacy devices). In some cases, the device 104D may be a gateway device that is allowed to send reservation requests for transmission opportunities to the other device even when the other device implements the first security profile. The device 104D may be allowed to request transmission opportunities to all MoCA devices, including authorized and unauthorized legacy MoCA devices. In such cases, the device 104D may receive a grant of the reservation request (310) and may encrypt a data communication (e.g., data traffic datagrams, data frames) (315) using an encryption key, where the device 104D may determine the encryption key based on (e.g., derived from) a password associated with the first security profile. The device 104D may transmit, over the network medium, the encrypted first data communication to the other device (320).

When the other device implements the second security profile, the device 104D may receive, over the network medium, a grant of the reservation request from the NC (310). The device 104D may encrypt a data communication (e.g., data traffic datagrams, data frames) (315) using an encryption key, where the device 104D may determine the encryption key based on (e.g., derived from) a password associated with the second security profile. The password may be a 64 byte passphrase. The encryption may be based on AES encryption. The device 104D may transmit, over the network medium, the encrypted first data communication to the other device (320).

When the other device implements the third security profile, the device 104D may receive, over the network medium, a grant of the reservation request from the NC (310). The device 104D may encrypt the data traffic (e.g., data frames) (315) using an encryption key, where the encryption key is based on (e.g., derived from) a password associated with the first security profile. In other words, the password associated with the first security profile is the same as the password associated with the third security profile. The password may be a legacy password, which may be a 17 decimal digit password. The encryption may be based on AES encryption when the other device is AES-enabled (e.g., MoCA 2.0 legacy device). The encryption may be based on DES encryption when the first device is not AES-enabled (e.g., MoCA 1.0 or 1.1 legacy device). The device 104D may transmit, over the network medium, the encrypted data traffic to the other device (320).

Figure 4:
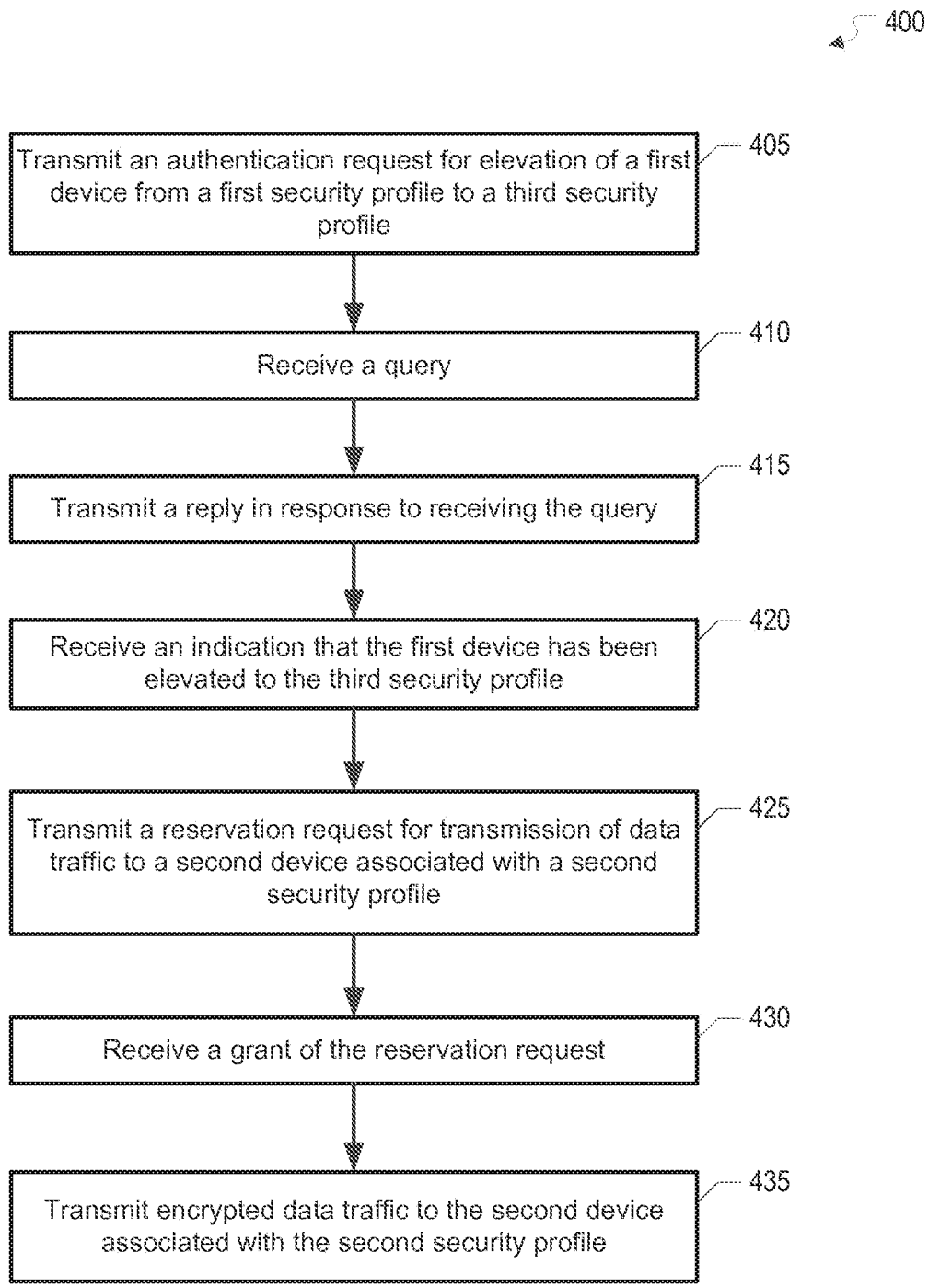
FIG. 4 illustrates a flow diagram of an example process in a system of security for mixed networks in accordance with one or more implementations.

FIG. 4 illustrates a flow diagram of an example process 400 in a system of security for mixed networks in accordance with one or more implementations. For explanatory purposes, the device 104E is a legacy MoCA device of the example network environment 100 of FIG. 1. The example process 400 is described herein with reference to the device 104E of the example network environment 100 of FIG. 1; however, the example process 400 is not limited to the device 104E of the example network environment 100 of FIG. 1. The blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

Prior to performing the example process 400, the device 104E is associated with the first security profile, e.g. an unauthorized legacy MoCA device. The device 104E may be AES-enabled or not AES-enabled. As an unauthorized legacy MoCA device, the device 104E may transmit, over a network medium (e.g., coaxial medium), a reservation request to an NC for transmission to another device of a network. The reservation request may be a request for transmission of data traffic over the network medium to a device that implements the first security profile, e.g. an unauthorized legacy MoCA device such as the device 104B. The reservation request may be a request for transmission of data traffic over the network medium to a device that implements the second security profile, e.g. a non-legacy MoCA device such as the device 104A. The reservation request may be a request for transmission of data traffic over the network medium to a device that implements the third security profile, e.g. an authorized legacy MoCA device such as the device 104F.

When the other device implements the first security profile (e.g., an unauthorized legacy MoCA device) or the third security profile (e.g., an authorized legacy MoCA device), the device 104D may receive a grant of the reservation request from the NC. When the device 104D is AES-enabled (e.g., MoCA 2.0, MoCA 2.1, MoCA 2.5, MoCA 3.0, etc.), transmissions between the device 104D and AES-enabled legacy MoCA devices may be AES encrypted, with encryption keys derived from a legacy password shared by legacy MoCA devices of the network environment 100; and transmissions between the device 104D and legacy MoCA devices that are not AES-enabled (e.g., MoCA 1.0, MoCA 1.1, etc.) may be DES encrypted, with encryption keys derived from the legacy password shared by legacy MoCA devices of the network environment 100. When the device 104D is not AES-enabled, transmissions between the device 104D and legacy MoCA devices, whether AES-enabled or not AES-enabled, may be DES encrypted, with encryption keys derived from legacy password shared by legacy MoCA devices of the network environment 100.

When the other device implements the second security profile, a data communication (e.g., data traffic datagrams, data frames) sent from the device 104E to the other device may be ignored and/or dropped by the other device. To cause devices that implement the second security profile (e.g., non-legacy MoCA devices) to not ignore and not drop the data communication from the device 104E, the device 104E may transmit an authentication request to an authentication server for elevation of the device 104E to the third security profile, e.g. an authorized legacy MoCA device (405). In some cases, the authentication server is the NC (e.g., the device 104A). In other cases, the authentication server is separated from the NC and/or may be one of the non-legacy MoCA devices. The elevation to the third security profile may allow the device 104E to be authorized to communicate with devices associated with the second security profile (e.g., non-legacy MoCA devices). The request may be utilized to trigger an authentication, e.g. initiate an authentication procedure. In some cases, the authentication procedure may be based on a challenge-response authentication procedure.

In one or more implementations, a software program (e.g., daemon software program) may be run on the device 104E that causes the device 104E to send the request to a network management device for elevation to the third security profile. The software program may be run on a layer different from the PHY layer and/or the MAC layer of the legacy MoCA devices. Thus, the software program may facilitate the elevation of legacy MoCA devices to authorized legacy MoCA devices without reconfiguring the PHY layer and/or the MAC layer of the legacy MoCA devices. The MSO may allow or may cause the software program to be run on the device 104E to allow the device 104E to initiate communication with the network management device to cause elevation of the device 104E to the third security profile. In some cases, the network management device is the NC. In some cases, the network management device is the authentication server. In some cases, the network management device may be separated from the NC and/or the authentication server and/or may be one of the non-legacy MoCA devices.

The device 104E may receive a query from the authentication server (410). The query may be a challenge sent by the authentication server to cause the device 104E to verify its identity to the authentication server. The device 104E may transmit a reply (e.g., an answer, a password, a key, etc.) in response to receiving the query (415). Blocks 410 and 415 together may be referred to as an authentication or an authentication procedure, and may be performed to cause authentication of the device 104E. In some cases, the reply may be transmitted to the authentication server. In the case that the authentication server is separated from the NC, when the reply is valid, the authentication server may inform the NC that the device 104E has been elevated to the third security profile. In some cases, the authentication server may inform the network management device, and the network management device may inform the NC. When the reply is valid (e.g., the reply provides a correct answer to the query), the device 104E may receive an indication from the NC that the device 104E has been elevated to the third security profile (420). The NC may notify devices associated with the second security profile, such as non-legacy MoCA devices, that the device 104E has been elevated to the third security profile (e.g., the device 104E is an authorized legacy MoCA device).

Subsequent to the elevation, the device 104E may transmit a reservation request, from the NC, for transmission of data traffic to a device associated with the second security profile (425), such as non-legacy MoCA devices. The device 104E may receive a grant of the reservation request (430). The device 104E may transmit encrypted data traffic to the device associated with the second security profile (435). The encrypted data traffic may be decrypted and consumed by the device associated with the second security profile.

After elevation, when the device 104D is AES-enabled, transmissions between the device 104D and AES-enabled legacy MoCA devices may be AES encrypted, with encryption keys derived from the legacy password shared by legacy MoCA devices of the network environment 100; and transmissions between the device 104D and legacy MoCA devices that are not AES-enabled may be DES encrypted, with encryption keys derived from the legacy password shared by legacy MoCA devices of the network environment 100. After elevation, when the device 104D is not AES-enabled, transmissions between the device 104D and legacy MoCA devices, whether AES-enabled or not AES-enabled, may be DES encrypted, with encryption keys derived from the legacy password shared by legacy MoCA devices of the network environment 100. Thus, in one or more implementations, encryption scheme and password for transmissions between the device 104D and legacy MoCA devices do not change after elevation of the device 104E from the first security profile to the third security profile.

After elevation, when the device 104D is AES-enabled, transmissions between the device 104D and non-legacy MoCA devices may be AES encrypted, with encryption keys derived from the legacy password shared by legacy MoCA devices of the network environment 100. After elevation, when the device 104D is not AES-enabled, transmissions between the device 104D and non-legacy MoCA devices may be DES encrypted, with encryption keys derived from the legacy password shared by legacy MoCA devices of the network environment 100.

After elevation to the third security profile, the device 104E may communicate with non-legacy MoCA devices as well as legacy MoCA devices, whether the legacy MoCA devices are authorized or unauthorized. In some cases, the device 104E may be utilized to relay information between unauthorized legacy MoCA devices and non-legacy MoCA devices, since the unauthorized legacy MoCA devices may not be allowed to communicate with the non-legacy MoCA devices, and vice versa. In this instance, the communications between the device 104E and the unauthorized MoCA devices may conform with the first security profile and the relayed communications to the non-legacy MoCA devices may conform with the first security profile. In some cases, the elevation to the third security profile may be considered as implementing the first security profile when the device 104E is communicating with other unauthorized or authorized legacy MoCA devices, and as implementing the second security profile when the device 104E is communicating with non-legacy MoCA device in terms of allowing authorized legacy MoCA devices to communicate with non-legacy MoCA devices, except that encryption of the communication between the device 104E and non-legacy MoCA devices is based on the legacy password.

Although in the foregoing description is made with reference to the non-legacy MoCA devices implementing and enforcing their settings in connection with allowing all data traffic datagram transmissions, allowing no data traffic datagram transmissions, or allowing some data traffic datagram transmissions with legacy MoCA devices, in one or more implementations, the NC may facilitate implementing and/or enforcing the settings. In some implementations, the NC does not allow legacy devices to communicate with non-legacy devices, except in a few exceptions. For example, the NC may deny a reservation request from a non-legacy MoCA device for transmission opportunities to an unauthorized legacy MoCA device. As another example, the NC may deny a reservation request from an unauthorized legacy MoCA device for transmission opportunities to a non-legacy MoCA device.

As an example exception, the NC may allow non-legacy devices that are gateway devices to communicate with the unauthorized legacy devices. For instance, the non-legacy devices that are gateway devices (e.g., the device 104A) may be allowed to request transmission opportunities to all MoCA devices, including authorized and unauthorized legacy MoCA devices. In this regard, the gateway devices and/or the authorized legacy MoCA devices may be utilized to relay information between unauthorized legacy MoCA devices and non-legacy MoCA devices that are not gateway devices.

Figure 5:
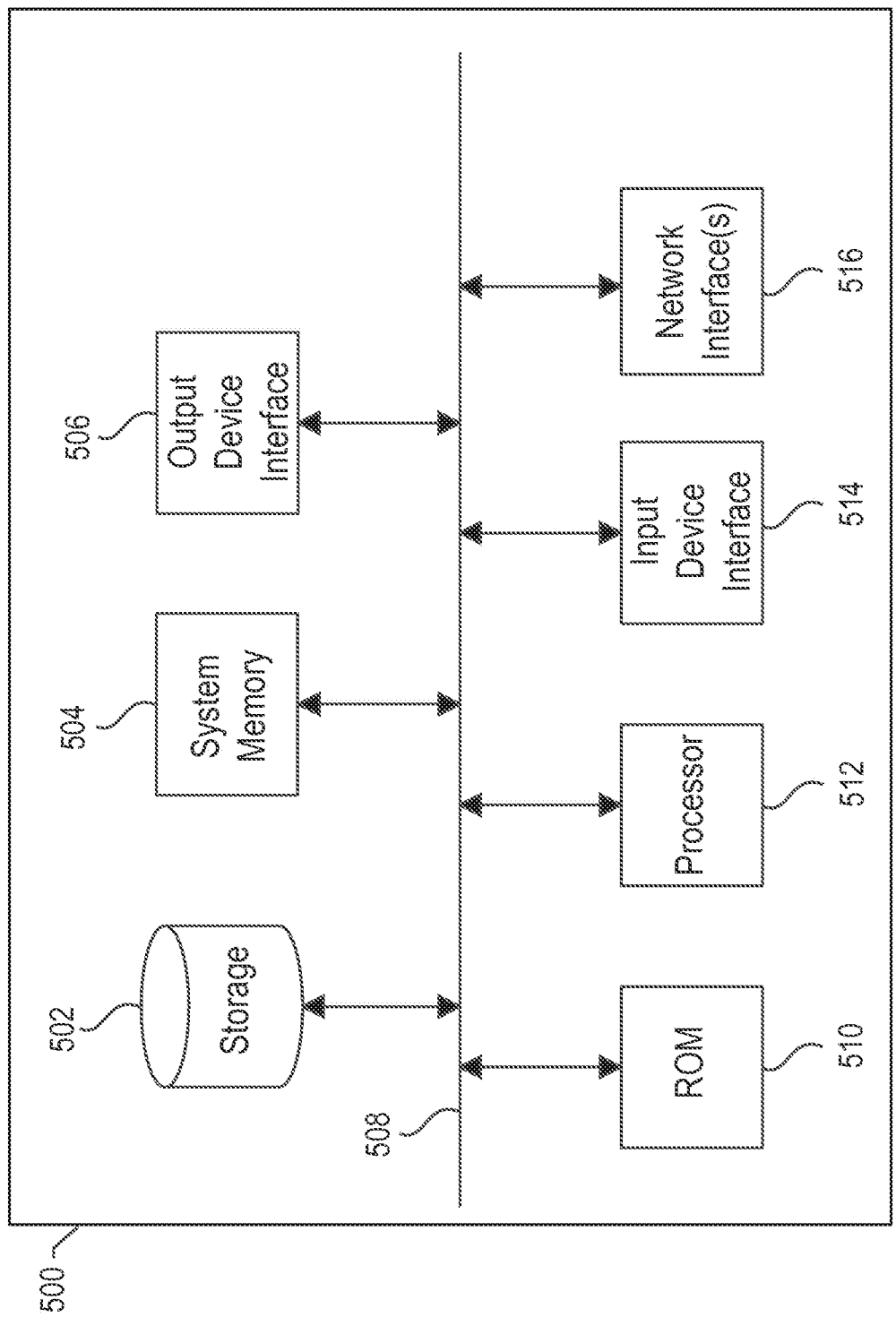
FIG. 5 conceptually illustrates an example electronic system with which one or more implementations of the subject technology can be implemented.

FIG. 5 conceptually illustrates an example of an electronic system 500 with which one or more implementations of the subject technology can be implemented. The electronic system 500, for example, may be, or may include, the devices 104A-F, such as a desktop computer, a laptop computer, a tablet computer, a phone, a gateway device, a set-top-box, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, such as a prism projector that may be included in a smart glasses device, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include an Ethernet interface, a WiFi interface, a Bluetooth interface, a Zigbee interface, a multimedia over coax alliance (MoCA) interface, a reduced gigabit media independent interface (RGMII), or generally any interface for connecting to a network. In this manner, electronic system 500 can be a part of one or more networks of computers (such as a local area network (LAN), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A network coordinator device comprising:
    a memory; and
    at least one processor configured to:
        coordinate first transmissions of first devices over a physical network medium, wherein the first transmissions have a first security profile, and encryption associated with the first security profile is based at least on a first password;
        coordinate second transmissions of second devices over the physical network medium, wherein the second transmissions have a second security profile that differs from the first security profile, encryption associated with the second security profile is based at least on a second password, and the second password is longer than the first password;
        coordinate third transmissions of third devices over the physical network medium, wherein the third transmissions have a third security profile that differs from the first security profile and the second security profile, and encryption associated with the third security profile is based at least on the first password; and
        concurrently coordinate the first transmissions, the second transmissions, the third transmissions, and communications over the physical network medium between at least one of the first devices and at least one of the second devices.

2. The network coordinator device of claim 1, wherein the third devices are authorized to communicate with the second devices.

3. The network coordinator device of claim 1, wherein:
    the first password is shared by the first devices, the second devices, and the third devices; and
    the second password is shared by the second devices.

4. The network coordinator device of claim 1, wherein:
  transmissions between a first device of the second devices and a first device of the first devices are encrypted using one of a first encryption scheme or a second encryption scheme;
  transmissions between the first device of the second devices and a first device of the third devices are encrypted using one of the first encryption scheme or the second encryption scheme; and
  transmissions between the first device of the second devices and a second device of the second devices are encrypted exclusively using the second encryption scheme.

5. The network coordinator device of claim 1, wherein the at least one processor is further configured to:
  grant at least one reservation request to allow one or more transmissions between one device of the first devices and at least one of another device of the first devices, one device of the second devices, or one device of the third devices.

6. The network coordinator device of claim 1, wherein the first security profile of the first devices is maintained independently of the second security profile of the second devices.

7. The network coordinator device of claim 1, wherein the at least one processor is further configured to:
  receive an indication that a network device has been authenticated; and
  transmit a notification to the second devices, the notification comprising an indication that the network device has been authenticated.

8. A method comprising:
  coordinating first transmissions of first devices over a physical network medium, wherein the first transmissions have a first security profile, and encryption associated with the first security profile is based at least on a first password;
  coordinating second transmissions of second devices over the physical network medium, wherein the second transmissions have a second security profile that differs from the first security profile, encryption associated with the second security profile is based at least on a second password, and the second password is associated with a higher password strength than the first password;
  authorizing at least one of the first devices transmitting the first transmissions to transmit third transmissions having a third security profile to communicate with second devices over the physical network medium; and
  coordinating, concurrently with coordinating the first and second transmissions, the third transmissions of at least one of the first devices over the physical network medium in addition to the first transmissions of the at least one of the first devices, wherein the third transmissions have the third security profile that differs from the first security profile of the first transmissions and the second security profile of the second transmissions, and encryption associated with the third security profile is based at least on the first password.

9. The method of claim 8, wherein the first security profile of the first devices is maintained independently of the second security profile of the second devices.

10. The method of claim 8, wherein the coordinating the first transmissions comprises granting at least one reservation request to allow one or more transmissions between one device of the first devices and at least one of another device of the first devices, one device of the second devices, or one device of the at least one of the first devices.

11. The method of claim 8, further comprising:
  receiving an indication that a network device has been authenticated; and
  transmitting a notification to the second devices, the notification comprising an indication that the network device has been authenticated.

12. The method of claim 8, wherein:
  the first password is shared by the first devices and the second devices; and
  the second password is shared by the second devices.

13. The method of claim 8, wherein:
  transmissions between a first device of the second devices and a first device of the first devices are encrypted using one of a first encryption scheme or a second encryption scheme;
  transmissions between the first device of the second devices and a first device of the at least one of the first devices are encrypted using one of the first encryption scheme or the second encryption scheme; and
  transmissions between the first device of the second devices and a second device of the second devices are encrypted exclusively using the second encryption scheme.

14. A non-transitory machine readable medium comprising code that, when executed by at least one processor, causes the at least one processor to perform operations, the code comprising:
  code to coordinate first transmissions of first devices over a network medium, wherein the first transmissions have a first security profile, and encryption associated with the first security profile is based at least on a first password;
  code to coordinate second transmissions of second devices over the network medium, wherein the second transmissions have a second security profile that differs from the first security profile, encryption associated with the second security profile is based at least on a second password, and the second password is associated with a higher password strength than the first password; and
  code to coordinate, concurrently with coordinating the first and second transmissions, third transmissions of third devices over the network medium, wherein the third transmissions have a third security profile that differs from the first security profile and the second security profile, and encryption associated with the third security profile is based at least on the first password.

15. The non-transitory machine readable medium of claim 14, wherein the third devices are authorized to communicate with the second devices.

16. The non-transitory machine readable medium of claim 14, wherein:
  transmissions between a first device of the second devices and a first device of the first devices are encrypted using one of a first encryption scheme or a second encryption scheme;
  transmissions between the first device of the second devices and a first device of the third devices are encrypted using one of the first encryption scheme or the second encryption scheme; and
  transmissions between the first device of the second devices and a second device of the second devices are encrypted exclusively using the second encryption scheme.

17. The non-transitory machine readable medium of claim 14, wherein the first security profile of the first devices is maintained independently of the second security profile of the second devices.

18. The non-transitory machine readable medium of claim 14, wherein:
the first password is shared by the first devices, second devices, and third devices; and
the second password is shared by the second devices.

19. The non-transitory machine readable medium of claim 14, wherein the code further comprises:
code to grant at least one reservation request to allow one or more transmissions between one device of the first devices and at least one of another device of the first devices, one device of the second devices, or one device of the third devices.

20. The non-transitory machine readable medium of claim 14, wherein the code further comprises:
code to receive an indication that a network device has been authenticated; and
code to transmit a notification to the second devices, the notification comprising an indication that the network device has been authenticated.

\* \* \* \* \*